United States Patent
Trieu et al.

(10) Patent No.: US 10,425,589 B2
(45) Date of Patent: Sep. 24, 2019

(54) ADAPTIVE XDR VIA RESET AND MEAN SIGNAL VALUES

(71) Applicant: Intevac, Inc., Santa Clara, CA (US)

(72) Inventors: Simeon Su-Ming Trieu, San Jose, CA (US); Emil Abraham Wilke, San Jose, CA (US)

(73) Assignee: INTEVAC, INC., Santa Clara, CA (US)

(*) Notice: Subject to any disclaimer, the term of this patent is extended or adjusted under 35 U.S.C. 154(b) by 189 days.

(21) Appl. No.: 15/663,362

(22) Filed: Jul. 28, 2017

(65) Prior Publication Data
US 2019/0020805 A1    Jan. 17, 2019

Related U.S. Application Data

(60) Provisional application No. 62/368,142, filed on Jul. 28, 2016.

(51) Int. Cl.
| | |
|---|---|
| *H04N 5/235* | (2006.01) |
| *H04N 5/355* | (2011.01) |
| *G06T 5/50* | (2006.01) |
| *G06T 5/00* | (2006.01) |

(52) U.S. Cl.
CPC .......... *H04N 5/2355* (2013.01); *G06T 5/007* (2013.01); *G06T 5/50* (2013.01); *H04N 5/355* (2013.01); *H04N 5/35527* (2013.01); *H04N 5/35581* (2013.01)

(58) Field of Classification Search
CPC ............ H04N 5/2355; H04N 5/35527; H04N 5/35581; H04N 5/355; G06T 5/007; G06T 5/50
See application file for complete search history.

(56) References Cited

U.S. PATENT DOCUMENTS

| | | | |
|---|---|---|---|
| 2015/0063632 A1* | 3/2015 | Deng | G06T 7/254 |
| | | | 382/103 |
| 2017/0251151 A1* | 8/2017 | Hicks | H04N 5/37452 |

OTHER PUBLICATIONS

Spivak et al. (Power-Performance Tradeoffs in Wide Dynamic Range Image Sensors with Multiple Reset Approach (https://www.mdpi.com/journal/jlpea); vol. 1, issue 1 ; Published Mar. 14, 2011 and printed Mar. 20, 2019 (Year: 2011).*

* cited by examiner

*Primary Examiner* — Mekonnen D Dagnew
(74) *Attorney, Agent, or Firm* — Womble Bond Dickinson (US) LLP; Joseph Bach, Esq.

(57) ABSTRACT

Dynamic range of a photosensor is controlled dynamically improving image detail especially in dark and bright areas of the image. At least one reset threshold and one reset value are set. At the end of the frame integration the value of the average pixel and the value of the brightest pixel that was not reset are determined and, based on that, at least one of the reset threshold and the reset value are changed. The change may reduce/increase the reset threshold such that more/less pixels are being reset, may reduce/increase the reset value thereby causing the pixels to be reset to a lower/higher value, or change the timing of the reset. In some embodiments, a calculated value for the reset threshold and the reset value are averaged with calculated values of prior N frames, and the result is applied to the next frame.

26 Claims, 2 Drawing Sheets

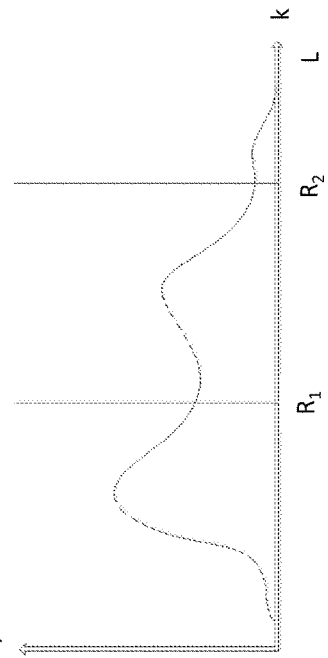
Fig. 1
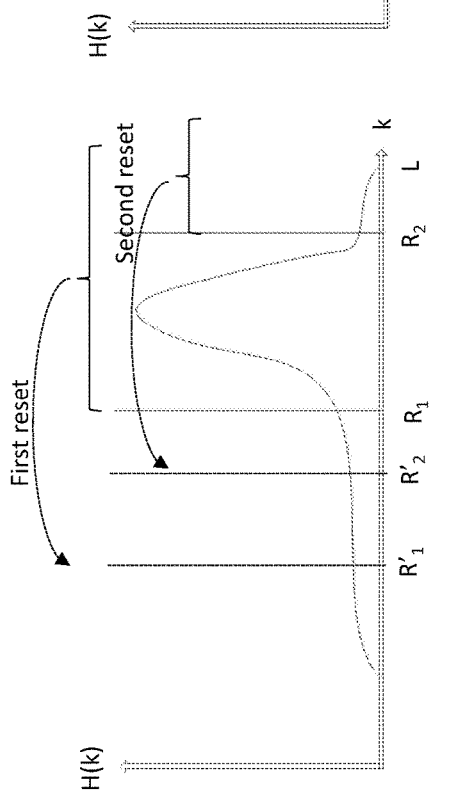
Fig. 3A
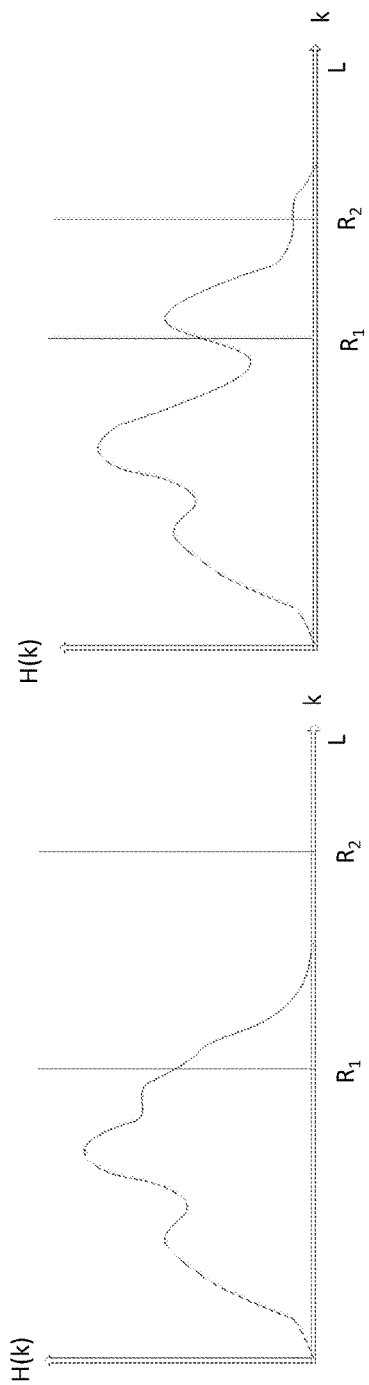
Fig. 2
Fig. 3B

ADAPTIVE XDR VIA RESET AND MEAN SIGNAL VALUES

RELATED APPLICATION

This Application claims priority benefit from U.S. Provisional Application Ser. No. 62/368,142, filed on Jul. 28, 2016, the disclosure of which is incorporated herein in its entirety.

BACKGROUND

1. Field

This invention relates to software, devices and methods to image or detect useful images, particularly at low light levels. The image may be acquired utilizing any photosensor of any digital camera. For low light applications the image may be acquired utilizing passive pixel sensors in an electron bombarded mode using a photocathode for detection or imaging at low light levels, i.e., night vision.

2. Related Art

Imaging sensors compose an image by integrating an incident signal or array of signals (pixels) over a frame period. Over this period, as signal is collected within the device the readout level of each pixel changes, indicating the relative amount of light sensed by the pixel.

The minimum measurable signal is limited by the sensitivity of the sensor (sensitivity threshold) and the precision of the device used to read the accumulated signal. Increased sensitivity allows for detection of smaller signals, while the precision accounts for the sensor's ability to resolve different signal levels. The maximum integrated signal is limited by the sensor's capacity to store this collected signal. A larger signal accumulates more quickly, and depending on the integration period, may overrun the pixel's ability to measure it. When the maximum signal amount has been stored, the sensor is considered "saturated," and any further signal is lost. Sensors must thus strike a balance between sensitivity threshold, readout precision, and capacity, based on the application.

The Intevac Silicon Imaging Engine (ISIE) incorporates in-frame partial reset functionality. This "soft reset" has the effect of raising the saturation value in stages. Generally the term reset is used when a pixel is reset to zero. However, in the context of this description, the shorthand "reset" will be used to indicate a "soft-reset", meaning that the pixel is not reset to zero, but to a non-zero value lower than its current value. For example, in a standard 256 grey level, at some point before the end of the integration period all pixels having value above, e.g., 180, may be reset to e.g., 120, while the integration of all pixels continues.

After the soft reset, the ISIE sensor continues to integrate over the remainder of the full integration period. Pixels that were above the soft reset threshold start this new integration period with the reset threshold as an offset. Pixels below the soft reset continue to collect signal normally. Multiple reset levels and fractional integration periods can be stacked within a single frame. After a specified number of integration periods, the camera maps these integrations into image space. So long as the durations of the integration periods and reset levels are known, mapping is straightforward.

For example, if a person with a flashlight enters an otherwise dark scene, every pixel illuminated by the flashlight is saturated. A sensor pixel collects photoelectrons on a capacitor. When a bright light source saturates a capacitor with more photoelectrons than its capacity will allow, the additional signal information is lost. As a result, objects illuminated by the flashlight have no detail in the image. If the integration period is shortened or a slower lens is used, the detail of bright areas could be resolved but the details in the dark areas would be lost or suppressed. Additionally, the flashlight itself is a few orders of magnitude brighter than the scenery it illuminates, which may result in lens flare, specular haze, or other glare-related artifacts.

By executing a soft reset at a known fraction of the frame, the sensor can maintain detail from the dark portions of the scene, and then continue to collect signal again over a shorter period for brighter regions, and can conceivably be reset again and integrate again for successively brighter portions of the same scene.

Utilizing the reset level and a time constant for integrating signal, the ISIE-based sensors are able to increase the dynamic range of scenes with varying illumination levels. This does not increase the precision of the sensor, but rather adds a temporal component to the magnitude of signal stored during a specific integration period, allowing it to scale the effective capacity of the pixel.

The dynamic range of a digital image device, such as a digital camera, is the ratio between the largest amount of light that the device can capture without saturation, to the lowest amount of light the device can accurately measure and distinguish from intrinsic image noise (electrical, thermal, etc.).

In a regular image sensor, at the end of every frame after an integration period, the image sensor resets the capacitor voltage to receive photoelectrons for the next frame. In this configuration, a pixel can become saturated. The extended dynamic range (XDR) sensor is used to retrieve lost signal by partially resetting the pixel voltage before the frame's integration period completes, and only when the voltage levels on the photodiode exceed certain voltage thresholds. The objective of these partial resets is to extend the integration time of saturated pixels to collect additional photoelectrons when bright light sources saturate those pixels. A possible method to control the reset voltage might be to use a digital-to-analog converter (DAC) to scale the reset voltage.

In standard XDR, the XDR parameters are fixed and do not change from frame to frame. The major disadvantage of a static XDR is that when a scene changes, the XDR parameters may not be optimal, resulting in too many/few reset pixels and thereby producing a poorly contrasted or excessively noisy image. In other words, a scene may be calibrated perfectly in the lab but fail to render a pleasing image when taken into the field. For example, the best XDR parameter fit for every possible contingency results in scenes which are lit by moderate city lights and look flat and unnatural. Another example may be, a camera was configured to maximize linear dynamic range and failed to allocate enough dynamic range to certain pixels. This may produce an area of low contrast that results in a "cottonball effect," where, for example, an area adjacent to a bright light source may be washed out, where the image detail is lost.

For further information the reader is directed to U.S. Pat. Nos. 6,307,586 and 7,411,168, and to publication 2014/0002694.

SUMMARY

The following summary is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Embodiments of the invention enable dynamic—on the fly—adjustment of the reset parameters for an image sensor. These embodiments provide enhanced capabilities for image sensor for handling very bright or very dark areas in the image, especially when these bright and/or dark areas may change with time as a sequence of images are generated. One example is entering a dark room, such that the image is composed of mostly pixels in the low end of the dynamic range, and then turning on a flashlight, which may create an image having pixels mostly at the high end of the dynamic range. Using a dynamic control of the XDR parameters, the details in both the dark image and the bright image can be enhanced.

In disclosed embodiments, dynamic range of a photosensor is controlled dynamically for improving image detail especially in dark and bright areas of the image. At least one reset threshold and one reset value are set. At the end of the frame integration the value of the average pixel and the value of the brightest pixel that was not reset are determined and, based on that, at least one of the reset threshold and the reset value are changed. The change may reduce/increase the reset threshold such that more/less pixels are being reset, may reduce/increase the reset value thereby causing the pixels to be reset to a lower/higher value, or change the timing of the reset. In some embodiments, a calculated value for the reset threshold and the reset value are averaged with calculated values of prior N frames, and the result is applied to the next frame.

According to disclosed embodiments, a method for dynamically controlling integration of output signal of a photon sensor is provided, comprising: initiating a frame wherein the output signal is continuously integrated for each pixel of the photon sensor for an integration period $t_f$; defining a first reset time $t_1$, shorter than the integration period $t_f$; setting a first reset threshold defining a value above which pixels will be reset; setting a first reset value defining a value to which pixels are reset; at the first reset time, resetting all pixels having value higher than the first reset threshold to the first reset value; and, at the end of the integration period, determining an average pixel value, and according to the average pixel value determining whether to set a new value for at least one of the first reset threshold and the first reset value for a next frame. Setting a new value for the first reset threshold may comprise setting the first reset threshold to equal average pixel value at end of the frame or to equal a value of brightest pixel which was never reset at end of the frame. The method for setting a new value for the first reset threshold may comprise calculating an average pixel value ratio by dividing the average pixel value by total number of bins, subtracting the average pixel value ratio from one to obtained a mirrored average pixel value ratio, and multiplying the mirrored average pixel value ratio by the total number of bins. The method of setting a new value for the first reset value may comprise calculating a pixel value that lies on a straight line from a value of darkest pixel to a value of brightest pixel which was never reset, on a histogram of the frame, or calculating a pixel value that is on an intersection of the first reset time $t_1$ and a straight line from value of darkest pixel to value of brightest pixel which was never reset, on a histogram of the frame. The method may further comprise setting a scaling factor and, when it is determined that at least one of the first reset threshold and the first reset value for a next frame should be changed, applying the scaling factor to at least one of the first reset threshold and the first reset value for a next frame. The method may further comprise the steps of: modifying the value of the first reset time $t_1$ when it is determined that at least one of the first reset threshold and the first reset value for a next frame should be changed. The method may further comprise setting a hysteresis threshold and when it is determined to change at least one of the first reset threshold and the first reset value for a next frame, calculating a change value and changing at least one of the first reset threshold and the first reset value only if the change value is above the hysteresis threshold.

The method may further comprise: defining a second reset time, $t_2$, shorter than the integration period $t_f$ but longer than the first reset time $t_1$; defining a second reset threshold; defining a second reset value; at the end of the integration period, determining a secondary average pixel value, and according to the secondary average pixel value determining whether to set a new value for at least one of the second reset threshold or second reset value for the next frame. Setting a new value for the second reset threshold may comprise setting the second reset threshold according to the secondary average pixel value, wherein the secondary average pixel value corresponds to an average pixel value calculated using only pixels with values greater than the first reset threshold, or setting the second reset threshold to equal a value of brightest pixel which was reset only once at end of the frame. Setting a new value for the second reset threshold may further comprise dividing the secondary average pixel value by total number of bins to obtain a secondary average pixel value ratio, and multiplying the secondary average pixel value ratio by total number of bins of value higher than the first reset threshold. The method may further comprise subtracting the secondary average pixel value ratio from 1 to obtain a mirrored second ratio and multiplying the mirrored second ratio by total number of bins of value higher than the first reset threshold. The method may further comprise adding an offset value equal to the value of the first reset threshold.

According to further disclosed aspects, a method for dynamically controlling an optical sensor is achieved by recursively performing the steps comprising: initiating a frame and integrating an output signal of all pixels of the sensor for a time period $t_f$; prior to ending the frame, at a preset time $t_1$, resetting all pixels having intensity value greater than a reset threshold, $R_1$, to a reset value, $R'_1$, that is lower than $R_1$; when reaching time $t_f$ ending integration of the output signal of all pixels and calculating an average pixel value for the frame; calculating new value for at least one of $R_1$ and $R'_1$ based on the average pixel value. In the method, when the average pixel value corresponds to a bright image, calculating new value for at least one of $R_1$ and $R'_1$ comprises calculating a value lower than current value, and when the average pixel value corresponds to a dark image, calculating new value for at least one of $R_1$ and $R'_1$ comprises calculating a value higher than current value. Also, when the average pixel value corresponds to a bright image, the method may further comprise the step of calculating lower value for time $t_1$, and when the average pixel value corresponds to a dark image, calculating higher value for time $t_1$.

The method may further comprise the steps: at a second preset time $t_2$, occurring after time $t_1$ but before time $t_f$, resetting all pixels having intensity value greater than a second reset threshold, $R_2$, to a second reset value, $R'_2$, wherein $R_2$ is higher than $R_1$; and, after time $t_f$ calculating a new value for at least one of $R_2$ and $R'_2$ based on secondary average pixel value, wherein the secondary average pixel value is calculated using only pixels having value larger than $R_1$.

In the method, calculating a new value for $R_1$ may be performed using one of the following relationships:

$$R_1 = L\left(1 - \frac{1}{L}\frac{\text{sum of all pixel values}}{\text{total pixel count}}\right); \text{ or}$$

$$R_1 = L\left(1 - \frac{S1}{L}\frac{\text{sum of all pixel values}}{\text{total pixel count}}\right); \text{ or}$$

$$R_1 = L\left(\frac{1}{L}\frac{\text{sum of all pixel values}}{\text{total pixel count}}\right);$$

and calculating a new value for $R_2$ may be performed using one of the following relationship:

$$R_2 = (L - R_1)\left(1 - \frac{1}{L}\frac{\text{sum of all pixels with values} > R_1}{\text{total count of pixels with values} > R_1}\right) + R_1; \text{ or}$$

$$R_2 = (L - R_1)\left(1 - \frac{S2}{L}\frac{\text{sum of all pixels with values} > R_1}{\text{total count of pixels with values} > R_1}\right) + R_1; \text{ or}$$

$$R_2 = (L - R_1)\left(\frac{1}{L}\frac{\text{sum of all pixels with values} > R_1}{\text{total count of pixels with values} > R_1}\right) + R_1;$$

wherein L is the total number of bins for the sensor and S1 and S2 comprise scaling factors. Also, calculating a new value for $R'_1$ may be performed using the following relationships:

$$R'_1 = (R_1 - O_{mean}) * \frac{t_1}{t_f} + O_{mean};$$

and a new value for $R'_2$ may be performed using the following relationship:

$$R'_2 = (R_2 - R'_1) * \frac{t_2 - t_1}{t_f - t_1} + R'_1;$$

wherein $O_{mean}$ is value of darkest pixel of the sensor.

The method may further comprise averaging the new value with new values calculated for N previous frames to obtain averaged new value, and applying the averaged new value to a following frame.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

FIG. 1 illustrates a histogram of an image with low dynamic range in the dual slope region.

FIG. 2 illustrates a histogram of an increased dynamic range in the dual slope region.

FIG. 3A illustrates an original static XDR histogram with decreased dynamic range and FIG. 3B illustrates an adaptive XDR histogram with increased dynamic range.

DETAILED DESCRIPTION

Figure 4:
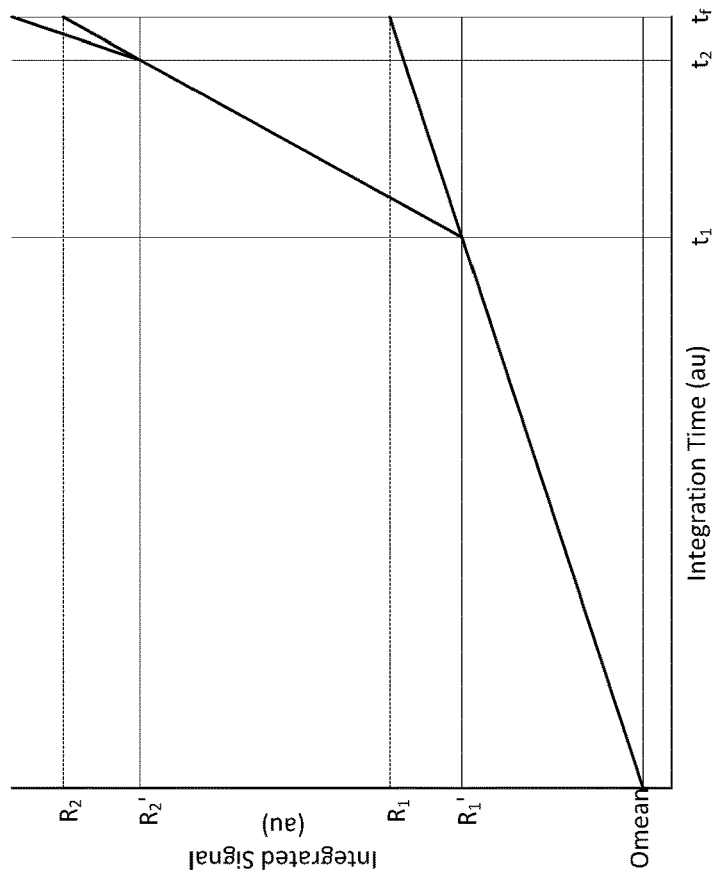
FIG. 4 illustrates Reset Thresholds and Reset Averages vs. Integration Time in a Frame Period.

Embodiments of the inventive adaptive XDR will now be described with reference to the drawings. Different embodiments or their combinations may be used for different applications or to achieve different benefits. Depending on the outcome sought to be achieved, different features disclosed herein may be utilized partially or to their fullest, alone or in combination with other features, balancing advantages with requirements and constraints. Therefore, certain benefits will be highlighted with reference to different embodiments, but are not limited to the disclosed embodiments. That is, the features disclosed herein are not limited to the embodiment within which they are described, but may be "mixed and matched" with other features and incorporated in other embodiments. Also, while not particularly described, in all of the embodiments the output of the photosensor is ultimately displayed on a screen.

Various histograms of images are shown in FIG. 1-FIG. 3b. The x-axis is the pixel bin for a particular grey level (e.g., for standard L=256 grey levels, zero would be at the axis for black and 255 at right for white) and the y-axis is the number of pixels of the sensor that read in that particular grey level. In the histograms, the region from 0 to $R_1$ is called the single-slope region, where $R_1$ is the first reset threshold. Pixels with values greater than $R_1$ are reset for the first time. The pixels encompassed in the first reset are from $R_1$ to $R_2$. The region from $R_1$ to $R_2$ is called the dual-slope region. Pixels in the dual-slope region have lower SNR than pixels in the single-slope region. Pixels with values greater than $R_2$ are reset for the second time. The pixels encompassed in the second reset are from $R_2$ to L (L=256 for standard grey level scale or a higher number for higher resolution system, e.g., 1024). The region from $R_2$ to L is called the triple-slope region. Pixels in the triple-slope region have lower SNR than pixels in the dual-slope region.

FIG. 1 shows the histogram of a flashlight producing a washout area with poorly contrasted imagery. This is an example of the so-called "cottonball effect." According to disclosed embodiments, a solution to this problem is to alter the XDR parameters dynamically to adjust for a dynamic scene. This method of adaptive XDR can increase dynamic range where it is needed in the scene and also reset as few pixels as possible, thereby increasing overall Signal to Noise Ratio (SNR). In some disclosed embodiments this is done by dynamically changing the values of $R_1$ and $R_2$, while in others the values of $R'_1$ and $R'_2$ and/or the timing of the reset may also be changed. Other variations are described below with reference to particular examples.

In disclosed embodiments the dynamic control of the XDR parameters may be done in real time on every pixel. In this context the term "real time" refers to processing of an image as soon as the image or image data is received or captured. Thus, real time indicates that the image is processed at least at a same rate at which the image is received (or captured). For example, for a 30 fps rate the XDR parameters may be calculated 30 times, although no change may be necessary or implemented for each frame. On the other hand, in some applications the dynamic control of the XDR parameters need not be in real time, but rather at a slower rate, e.g., after every x number of frames, or only when the change in the histogram surpasses a preset threshold. Another option is to calculate the change at every change, but to average that change with that of N number of prior frames, so as to smooth the transitions. The operation of the embodiments can be considered as follows.

At the start of the capturing of the frame, call it time $t_0$, all of the pixels are at bin zero (the lowest dark level the system can decipher above noise). With exposure time the pixels integrate the light intensity so that they start spreading to their corresponding bins. At certain preset time, $t_1$, all of the pixels that are above (i.e., brighter than) a resent threshold $R_1$ are reset to a lower value (shown as dotted-line arrow in FIG. 1), call it $R'_1$. As integration proceeds further, at a second time, say $t_2$, all of the pixels that are above $R_2$ are reset to a lower value $R'_2$. At the end of the frame, i.e., end of the integration time, $t_f$, the histogram shown in FIG. 1 results.

Since the histogram resulting from the frame has a large peak in the dual-slope region, many details of the image will be lost due to the high illumination caused by the peak in the dual-slope region. According to disclosed embodiments, the image is enhanced by adjusting the dynamic range of the image. This can be done by adjusting the values of the XDR parameters.

FIG. 2 shows more dynamic range being allocated to the washout region by moving the values of $R_1$ and $R_2$, thereby increasing the contrast and providing more details. In this example $R_1$ was moved to the left (reduced set point). The value of $R_2$ was also reduced, but by a smaller amount, such that the distance from $R_1$ to $R_2$ was increased, i.e., the span of the double-slope region was increased. Therefore, one way to consider this embodiment is as follows. A method for enhancing the dynamic range of a photosensor, comprising: integrating output signal of all pixels of the photosensor for frame a period $t_f$; setting a first reset threshold, $R_1$, and a second reset threshold, $R_2$, so as to define a slope region having a width between the first reset threshold, $R_1$, and the second reset threshold, $R_2$; determining the concentration of pixels in the slope region and adjusting at least one of the first reset threshold, $R_1$, and the second reset threshold, $R_2$, so as to change the width of the slope region. Also, the embodiment can be described as a method for enhancing the dynamic range of a photosensor, comprising: integrating output signal of all pixels of the photosensor for a frame period $t_f$; setting a plurality of intensity bins having values from zero to N, setting a first reset threshold, $R_1$, having value from zero to N, and a second reset threshold, $R_2$, having values from $R_1$ to N, so as to define a first slope region having a width from zero to $R_1$, a second slope region having a width from $R_1$ to $R_2$, and a third slope region having width from $R_2$ to N; determining the concentration of pixels in the first slope region, the second slope region and the third slope region, and adjusting at least one of the first reset threshold, $R_1$, and the second reset threshold, $R_2$, so as to change the width of at least one of the first slope region, the second slope region and the third slope region.

The following numerical example can help in understanding of this operation. Assuming that for the frame of FIG. 1, $R_1$ was set to 130 and $R_2$ was set to 220. Also, $R'_1$ was set to 110 and $R'_2$ was set to 200. At time $t_1$, all of the pixels that are brighter than 130 are reset to 110. Then, at $t_2$ all of the pixels that are brighter than 220 are reset to 200. In the particular scenario of the example of FIG. 1 that led to the so-called "cottonball effect." To avoid this effect, for the next frame the values are adjusted, e.g., $R_1$ is set to 100 (i.e., first reset includes some pixels that were not included in the reset of FIG. 1) so that the width of the first slope region is narrowed. The value of $R_2$ is set to 200, so that the width of the third slope region is increased. While $R_2$ is also moved to the left, it is moved fewer number of bins than the move of $R_1$ such that the span between $R_1$ and $R_2$, i.e., the width of the second slope region, is widened from 90 to 100. Also, in this example the value of $R'_1$ is set to 80 and $R'_2$ is set to 180. In essence, the effect of this method is to dynamically change the number of pixels that are being reset at each reset event. Additionally, the method may be used to dynamically change the reset value for each reset event. That is, the values of $R_1$ and $R_2$ control the number of pixels that will be reset in a reset event, while the values of $R'_1$ and $R'_2$ control the reset value assumed by reset pixels at a reset event. According to embodiments of the invention either or both values of the cut-off bins (reset thresholds $R_1$ and $R_2$) and reset values ($R'_1$ and $R'_2$) can be dynamically changed.

A further example of the operation of the method is as follows. It is sometimes desirable to maximize the area that is in the single-slope region, e.g., when the scene does not contain any bright light sources, as it increases overall SNR and dynamic range. For example, when the sensor images a dark area with a lot of shade, many details of the image may be lost. FIG. 3b shows a case where adaptive XDR increased dynamic range compared with FIG. 3a, the original image. In this particular case the value of $R_1$ was increased while the value of $R_2$ was decreased. Increasing the value of $R_1$ allowed more pixels to integrate the signal without being reset, or at least avoid the first reset. That is, the width of the first slope region is increased. Decreasing the value of $R_2$ enabled pushing some pixels into the triple-slope region, so that generally the image became brighter, but saturation may be avoided. The span between $R_1$ and $R_2$ was decreased, i.e., the double slope region was decreased, so that if the increase in $R_1$ may cause some pixel to potentially get saturated, such result may be avoided by inclusion of these pixel in the second rest, i.e., the width of the third slope region is increased.

Since over time scenes may change, such that a different response is obtained from the sensor, in disclosed embodiments the sensor is optimized dynamically by adjusting $R_1$ and $R_2$ and/or $R'_1$ and $R'_2$ on the fly. In this manner, it is possible to obtain a best-fit reset level(s) for each scene as the image is generated, or to make appropriate changes when the general lighting of the scene is changed, e.g., by an amount causing a change in the histogram beyond a set threshold.

The following provides exemplary embodiments to obtain XDR knee points (i.e., $R_1$ and $R_2$ cut-off bin values) dynamically. Several embodiments are shown as examples for various situations, but it should be appreciated that any one or combination of the embodiments may be implemented.

XDR Knees, Example #1

This embodiment may be used in situations such as, but not limited to: dim, specular, or diffused lighting. In this example, two knee points (reset thresholds) are used, $R_1$ and $R_2$. The purpose of $R_1$ is to segment shadows from light. For example, the case of two reset thresholds may be implemented by calculating $R_1$ and $R_2$ as shown below.

The first knee point (also sometimes referred to as reset threshold), $R_1$, is obtained by:

$$R_1 = L\left(1 - \frac{1}{L}\frac{\text{sum of all pixel values}}{\text{total pixel count}}\right),$$

where
L=the total number of bins (e.g., 256 for standard grey scale, 1024 for enhanced grey scale, etc.). The sum of all pixel values divided by the total pixel count represents the average pixel value for the frame. The average pixel value is then divided by L, the total number of bins, to yield a value from 0 to 1. This result represents the average pixel value ratio. In this particular example the ratio is mirrored by differencing 1 and the ratio, which allows us to shift $R_1$ upward in association with dark scenes and down in association with bright scenes. That is, if the value of the average pixel value ratio is less than 0.5 (indicating a darker scene), by mirroring the value of $R_1$ will be shifted to the right, while if the value of the average pixel value ratio is higher than 0.5 (indicating a brighter scene), by mirroring the value of $R_1$ will be shifted to the left. Finally, the mirrored result, which is still just a ratio number from zero to one, is transformed back into a digital number by multiplying by L.

The purpose of $R_2$ is to segment direct light sources from specular or attenuated light. To obtain the second reset threshold, only pixel values greater than $R_1$ are used. Therefore the value of $R_2$ is offset by $R_1$, and is obtained by:

$$R_2 = (L - R_1)\left(1 - \frac{1}{L}\frac{\text{sum of all pixels with values} > R_1}{\text{total count of pixels with values} > R_1}\right) + R_1$$

The average pixel value is calculated using only pixels with values greater than $R_1$. The result is divided by L to obtain the average pixel value ratio for all pixels having value greater than $R_1$. In this example the ratio is mirrored by differencing 1 and the ratio. The ratio is then scaled to match the range of bins from $R_1$ to L by multiplying the mirrored ratio by $(L-R_1)$. Finally, we add the offset, $R_1$, back in as an offset value.

In this example, if average pixel value is 400 and assuming a high resolution sensor with 1024 bins, then 400/L=0.391. Mirroring this value gives 1−0.391=0.609. But since pixel values range from 0 to L, we need to scale this back to the range of possible pixel values. We do this by multiplying by $(L-R_1)$ in the case of calculating for $R_2$, and L in the case of calculating for $R_1$. For our example, we are calculating for $R_2$, and let's assume $R_1$=300. So, 0.391*(1023−300)=282.693, which, in this specific example, will get rounded down to 282 so as to be over inclusive. However, this value needs to be offset from $R_1$, so adding $R_1$ back as an offset gives us $R_2$=282+300=582.

The values of $R_1$ and $R_2$ are designed for at least one of the following situations: 1) to increase dynamic range in the single-slope region (i.e., increase the width of the first slope region) when no direct light sources are present, 2) to increase dynamic range in the dual-slope region (i.e., increase the width of the second slope region) when only dim light sources are present and no direct lighting, and 3) to attenuate high value pixels more aggressively (i.e., increase the width of the third slope region) when the average pixel value for pixels with values greater than $R_1$ is close to saturation.

According to another feature that may be implemented in this or any other example illustrated herein, one or more scaling factor may be added. In some embodiments control of the scaling factor is made accessible to the camera operator, such that it gives the camera operator the ability to fine tune or calibrate the algorithm to their preferred use case. The scaling factor can be implemented when generating the average pixel value ratio. In such an implementation, rather than just dividing the average pixel value by L, the average pixel value is also multiplied by the scaling factor. For the embodiment of Example 1, this can be implemented as follows:

$$R_1 = L\left(1 - \frac{S1}{L}\frac{\text{sum of all pixel values}}{\text{total pixel count}}\right)$$

and $$R_2 = (L - R_1)\left(1 - \frac{S2}{L}\frac{\text{sum of all pixels with values} > R_1}{\text{total count of pixels with values} > R_1}\right) + R_1$$

where S1 and S2 may be the same or different scaling factors. As noted, this can be implemented in any of the illustrated example, such that any time the ratio 1/L appears in this description, it may be thought of as including the option of Sx/L, where x can be used to differentiate the scaling factors applied to the different thresholds, when different scaling factors are used.

XDR Knees, Example #2

This embodiment may be used in situations such as, but not limited to: direct light, low light, or when optics produce artifacts, such as lens flare, veiling glare, or specular haze. For example, the case of two reset thresholds may be implemented as below:

The first reset threshold, $R_1$, is obtained by:

$$R_1 = L\left(1 - \frac{1}{L}\frac{\text{sum of all pixel values}}{\text{total pixel count}}\right),$$

where
L=the total number of bins

The purpose of $R_1$ is to segment shadows from light. The ratio of pixel value sum and total pixel count, when divided by L, the total number of bins, yields a value from 0 to 1. This result represents the average pixel value ratio. We then mirror the ratio by differencing 1 and the ratio, which allows us to shift $R_1$ upward in association with dark scenes and down in association with light scenes. Finally, the mirrored result is transformed back into a digital number by multiplying by L.

The second reset threshold, $R_2$, which is offset by $R_1$, is obtained by:

$$R_2 = (L - R_1)\left(\frac{1}{L}\frac{\text{sum of all pixels with values} > R_1}{\text{total count of pixels with values} > R_1}\right) + R_1$$

The purpose of $R_2$ is to segment direct light sources from specular or attenuated light. To obtain the second reset threshold, only pixel values greater than $R_1$ are used. After obtaining the average pixel value ratio for pixels with values greater than $R_1$, the ratio is scaled to match the range of bins from $R_1$ to L. Note that no mirroring is performed in this example. Finally, the offset, $R_1$, is added back in as an offset value. For example, if $R_1=156$ and $L=256$, then the range of bins is 100 and the average pixel value will scale between 0 and 100. If the average pixel value ratio=0.5, then the average pixel value added to $R_1$ would be 50 and $R_2=206$.

In this example, $R_1$ and $R_2$ are designed for at least one of the following situations: 1) to increase dynamic range in the single-slope region (i.e., increase the width of the first slope region) when no direct light sources are present, 2) to increase dynamic range in the dual-slope region (i.e., increase the width of the second slope region) in the presence of direct light sources, such as the "cottonball effect", and 3) to limit the number of pixels in the noisy triple-slope range (i.e., decrease the width of the third slope region) to increase overall SNR.

XDR Knees, Example #3

This embodiment may be used in situations such as, but not limited to: when single-slope dynamic range must be maximized or noise must be kept to a minimum. For example, the case of two reset thresholds may be implemented as shown below:

The first reset threshold, $R_1$, is obtained by:

$$R_1 = L\left(\frac{1}{L}\frac{\text{sum of all pixel values}}{\text{total pixel count}}\right),$$

where
L=the total number of bins

The purpose of $R_1$ is to segment shadows from light. The ratio of pixel value sum and total pixel count, when divided by L, the total number of bins, yields a value from 0 to 1. This result represents the average pixel value ratio. The result is transformed back into a digital number by multiplying by L. Thus, in essence, in this example the value of $R_1$ is set to the average pixel value.

The second reset threshold, $R_2$, which is offset by $R_1$, is obtained by:

$$R_2 = (L-R_1)\left(\frac{1}{L}\frac{\text{sum of all pixels with values} > R_1}{\text{total count of pixels with values} > R_1}\right) + R_1$$

The purpose of $R_2$ is to segment direct light sources from specular or attenuated light. To obtain the second reset threshold, only pixel values greater than $R_1$ are used. After obtaining the average pixel value ratio for pixels with values greater than $R_1$, the ratio is scaled to match the range of bins from $R_1$ to L. Finally, add the offset, $R_1$, back in as a value offset. For example, if $R_1=156$ and $L=256$, then the range of bins is 100 and the average pixel value will scale between 0 and 100. If the average pixel value ratio=0.4, then the average pixel value added to $R_1$ would be 40 and $R_2=196$. Conversely, if the average pixel value ratio=0.6, then the average pixel value added to $R_1$ would be 60 and $R_2=216$.

In this example, $R_1$ and $R_2$ are designed for the following situation: increasing dynamic range in the single-slope region in many lighting conditions, therefore increasing overall SNR.

XDR Knees, Example #4

This embodiment may be used in situations such as, but not limited to: direct and specular light. For example, the case of two reset thresholds may be implemented as shown below:

The first reset threshold, $R_1$, is obtained by:

$$R_1 = L\left(\frac{1}{L}\frac{\text{sum of all pixel values}}{\text{total pixel count}}\right),$$

where
L=the total number of bins.

The purpose of $R_1$ is to segment shadows from light. The ratio of pixel value sum and total pixel count, when divided by L, the total number of bins, yields a value from 0 to 1. This result represents the average pixel value ratio. The result is transformed back into a digital number by multiplying by L. Since the factor L cancels the fraction 1/L, in this example $R_1$ is effectively set to be the average pixel value.

The second reset threshold, $R_2$, which is offset by $R_1$, is obtained by:

$$R_2 = (L-R_1)\left(1 - \frac{1}{L}\frac{\text{sum of all pixels with values} > R_1}{\text{total count of pixels with values} > R_1}\right) + R_1$$

The purpose of $R_2$ is to segment direct light sources from specular or attenuated light. To obtain the second reset threshold, only pixel values greater than $R_1$ are used. After obtaining the average pixel value ratio for pixels with values greater than $R_1$, we mirror the ratio by differencing 1 and the ratio. The result is scaled to match the range of bins from $R_1$ to L and then the value, $R_1$, is added back in as a value offset. For example, if $R_1=156$ and $L=256$, then the range of bins is 100 and the average pixel value will scale between 0 and 100. If the average pixel value ratio=0.4, then the average pixel value added to $R_1$ would be 60 and $R_2=216$. Conversely, if the average pixel value ratio=0.6, then the average pixel value added to $R_1$ would be 40 and $R_2=196$.

In this example, $R_1$ and $R_2$ are designed for at least one of the following situations: 1) to increase dynamic range in the single-slope region, 2) to aggressively attenuate specular and direct light sources, and 3) to increase dynamic range in the triple-slope region to be able to resolve more details from direct light sources.

One XDR Knee, Example #5

Attention is now directed to FIG. 4, which illustrates the integration plot for one frame. The x-axis is the integration time in arbitrary units, while the y-axis is the integrated signal in arbitrary units. Time $t_1$ is the time that the first reset is implemented, time $t_2$ is the time at which the second reset is implemented, and time $t_f$ is the time of end of integration and the frame is read. The point of intersection of $R_1$ and $t_f$ indicates the value of the brightest pixel which was never reset, and the point of intersection of $R_2$ and $t_f$ indicates the value of the brightest pixel which was reset only once, i.e., at $t_1$.

As disclosed above, in the disclosed embodiments the reset pixels are not reset to zero, but to a value lower than their current value. The intersection of $R'_1$ and $t_1$ indicates the value to which all of the pixels are reset to at time $t_1$. Therefore, the intersection of $R'_1$ and $t_1$ also indicates the value of the brightest pixel at the time of the first reset, $t_1$. The intersection of $R'_2$ and $t_2$ indicates the value to which all of the pixels higher than $R_2$ are reset to at time $t_2$. Therefore, the intersection of $R'_2$ and $t_2$ also indicates the value of the brightest pixel at the time of the second reset, $t_2$.

It has been discovered by the present inventors that the best results can be achieved when the value of $R'_1$ is calculated to be on a straight line extending from initial value to max value, where initial value is the zero value that the sensor can perceive above noise level, and is the value at which the pixels are initiated at prior to starting integration for the frame, while the max value is the value of the brightest pixel that was never reset.

As the value of the largest un-reset pixel at the time of the reset pulse cannot be read until the full integration has completed, this must be extrapolated from the previous frame. This value is assigned the value of $R_1'$. $R_1'$ is defined as:

$$R'_1 = (R_1 - O_{mean}) * \frac{t_1}{t_f} + O_{mean},$$

where
The value "$t_1$" is the time within the frame that the first reset pulse takes place.
The value "$t_f$" is the full-frame integration time.
$O_{mean}$ is the average dark value of the sensor (i.e. a flat image with no light or the value of the darkest pixel).
The value of $R_1 - 0_{mean}$ provides the value of the max value and when multiplied by the ratio of total integration time and time at first reset, i.e., $t_1/t_f$, it provides the value of the brightest pixel at time of the reset, $t_1$, on a straight line from $0_{mean}$ to $t_f$. However, the offset for the minimum sensitivity of the pixel must be reintroduced by adding $0_{mean}$. In order to correctly interpret the image, the following information is used:
The average brightness of the most recent frame
The average brightness of the reset pixels, immediately after they are reset
The fraction of the full-frame duration at which the reset is executed
The duration of a frame
The "brightness" of a dark scene
Average brightness of the most recent frame was derived previously, as mentioned above:

$$\frac{\text{sum of all pixel values}}{\text{total pixel count}}$$

The R-values, as explained above, correspond to the average brightness of the reset pixels for the current frame. The way these are determined can be changed as previously explained in order to better suit the user's need.

In order to assign an appropriate reset level and scaling factor, the full-frame brightness of the largest un-reset pixel must be backed out. This corresponds to a pixel that is equal to the reset threshold both immediately before and immediately after the reset takes place. Everything above this value is scaled according to the duration of the post-reset integration. That is, at the end of the integration period, any pixel reporting a value greater than R has necessarily been reset. Therefore, to obtain its true value (i.e., had it not been reset), the pixel must be scaled back to "remove" the effect of the reset. Thus, the true value of a pixel reporting a value p that is greater than R can be calculated as: $Q=(p-R)*((1-tn/tf)^{-1})+R$.

This application is useful for scenes with at least one of these distinct regions of illumination: 1) a dark street lit by lamps that are not in the field of view, or 2) a single scene containing bright sources, such as a horizon scene at moonrise or moonset.

In this example, the time $t_1$ may be adjusted to provide enough integration time to the illuminated regions of a scene, or it can be set so that a bright source such as the moon does not smother the detail in the rest of the scene.

Two XDR Knees, Example #6

In Example 5 a method for deriving the first reset value is illustrated, which can be used in a case where only one reset is used, or as a first reset value when more than one reset values are used. The following description illustrates how to derive the reset value $R'_2$ for a case having at least two resets.
For the second reset, the values are:

$$R'_2 = (R_2 - R'_1) * \frac{t_2 - t_1}{t_f - t_1} + R'_1,$$

where
$R_2$ is derived using any of the examples described above, e.g., in examples #1 through #4.
$R_1'$ is derived using the method illustrated in example #5.
$R_2'$ is the value of a pixel which, after full integration, is equal to $R_2$, and corresponds to the desired reset threshold at time $t_2$.
The value "$t_1$" is the time within the frame that the first reset pulse takes place.
The value "$t_2$" is the time within the frame that the second reset pulse takes place.
The value "$t_f$" is the full-frame integration time.
In order to correctly interpret the image, the following information is used:
The average brightness of the most recent frame.
The average brightness of the reset pixels, immediately after they are reset.
The fraction of the full-frame duration at which the reset is executed.
The duration of a frame.
The "brightness" of a dark scene, i.e., $O_{mean}$.
Average brightness of the most recent frame was derived previously, as mentioned above:

$$\frac{\text{sum of all pixel values}}{\text{total pixel count}}$$

The R-values, as explained above, correspond to the average brightness of the reset pixels for the current frame. The way these are determined can be changed as previously explained in order to better suit the user's need.

In order to assign an appropriate reset level and scaling factor, the full-frame brightness of the largest un-reset pixel must be backed out. This corresponds to a pixel that is equal to the reset threshold both immediately before and immediately after the reset takes place. Everything above this value is scaled according to the duration of the post-reset integration.

Scenes viewed at a distance may contain dark regions and illuminated regions such as cities, airports, and parking lots. These scenes will sometimes contain direct sources of illumination, such as street or runway lights, or vehicle lights. In this condition, the sensor may be reset twice in order to provide both dynamic range for dark and illuminated terrain, and attenuation for the direct sources. In this example, as before, the t-values may also be varied in order to best suit the situation. For example, shortening the time to the first reset, $t_1$, can help in avoiding the direct light sources saturate the pixels or wash out the image in the surrounding area. Conversely, delaying the timing of the first reset, $t_1$, can help in collecting more photons from exceedingly dark areas. Every pixel on the array can be reset simultaneously but also independently, so only pixels over the R' value(s) are reset at their corresponding reset times.

Many XDR Knees, Example #7

Implementation of the invention is not limited to one or two resets, but rather to any number of resets. Using the approaches previously described, it is possible to include as many XDR knees as a sensor will allow.

$$R'_n = (R_n - R'_{n-1}) * \frac{t_n - t_{n-1}}{t_f - t_{n-1}} + R'_{n-1}$$

$R_n$ is found similarly to $R_2$ (see examples #1-#4), with the average of pixels over $R_{n-1}$ used to determine it.
$R_{n-1}'$ is derived from a previous expression, the same way as $R_2$.
$R_n'$ is the value of a pixel which, after full integration, is equal to $R_n$, and corresponds to the desired reset threshold at time $t_n$.
The value "$t_{n-1}$" is the time within the frame that the reset pulse prior to the pulse of interest takes place.
The value "$t_n$" is the time within the frame that the $n^{th}$ reset pulse takes place.
The value "$t_f$" is the full-frame integration time.
In order to correctly interpret the image, the following information is used:
The average brightness of the most recent frame.
The average brightness of the reset pixels, immediately after they are reset.
The fraction of the full-frame duration at which the reset is executed.
The duration of a frame.
The "brightness" of a dark scene.
Average brightness of the most recent frame was derived previously, as mentioned above:

$$\frac{\text{sum of all pixel values}}{\text{total pixel count}}$$

The R-values, as explained above, correspond to the average brightness of the reset pixels for the current frame. The way these are determined can be changed as previously explained in order to better suit the user's need.

In order to assign an appropriate reset level and scaling factor, the full-frame brightness of the largest un-reset pixel must be backed out. This corresponds to a pixel that is equal to the reset threshold both immediately before and immediately after the reset takes place. Everything above this value is scaled according to the duration of the post-reset integration.

This approach can prove useful for maintaining a ceiling on bright scenes. By executing multiple reset pulses and varying the time between resets, the sensor can be set to limit bright sources, or everything above a particular threshold. This would allow a sensor to resolve multiple regions of illumination without being washed out by extremely bright sources, provided the sensor itself is not damaged by these sources.

In this sense, this embodiment can be defined as a method for enhancing the dynamic range of a photosensor, comprising: setting an integration period of a frame $t_f$; setting a plurality of n reset periods, $t_n$, wherein n is a positive natural number; setting a plurality of n reset values $R'_n$; recursively performing the steps of i. integrating output signal of all pixels of the photosensor over the integration period, while performing reset operation at times $t_n$ using the reset values $R'_n$, to thereby obtain integrated signal, ii. displaying the integrated signal on a screen, iii. from the integrated signal, calculating a max value $R_n$, defined as the brightest value of a pixel that was not reset at time $t_{n-1}$; and iv. calculating each of the n reset values $R'_n$ according to the relation:

$$R'_n = (R_n - R'_{n-1}) * \frac{t_n - t_{n-1}}{t_f - t_{n-1}} + R'_{n-1}.$$

Multislope (MS) Levels

The multislope (MS) level is a digital number that may be converted to an analog reset voltage through a Digital-to-Analog Converter (DAC). Sensors generally may have bit depth of 8 bit (for L=256), 10 bit (for L=1024) 12 bit (for L=4095), etc. Conversely, the DAC may have a different bit depth, e.g., 6 bit. Therefore, for cases where the sensor bit depth is different from the bit depth of the MS level, the following shows the conversion from the sensor bit depth to the MS level bit depth (in this particular example for two pixel reset levels):

$$ms1 = \left\lfloor \frac{R'_1}{2^{\Delta b}} \right\rfloor$$

$$ms2 = \left\lfloor \frac{R'_2}{2^{\Delta b}} \right\rfloor$$

where $\Delta b$ is the difference in the bit depth between the sensor and the MS level (e.g., $\Delta b=10-6=4$ for a sensor having bit depth of 10 bit and DAC having bit depth of 6 bit). The number of MS levels (two in the above example) is equal to the number of pixel resets. Stated another way, if the DAC supports a smaller bit depth, the available number of reset value are mapped onto the number of available bins (L) of the sensor. To illustrate, using the above example, the sensor supports 10 bit depth, while the DAC supports only 6 bit depth, so that $\Delta b=4$. Say $R'_1$ is calculated to be 720 and $R'_2$ is calculated to be 960. Using the above relationship we map $R'_1$ to $ms_1=45$ and $R'_2$ to $ms_2=60$. Thus, the granularity of the actual reset value is reduced somewhat form the granularity available at the sensor. However, this can serve as an inherent filter, since a change in the reset value will not take place unless it is above the granularity supported by the DAC.

An N-tap Infinite Impulse Response (IIR) moving average filter may be used to account for large movements in MS levels that can cause oscillations under certain conditions. Each MS level will have its own N-tap ER moving average filter. The last N-1 First-In-First-Out (FIFO) values are saved from previous frames, and then the MS levels are averaged together, as shown below:

$$ms_{avg} = \frac{ms_n + ms_{n-1} + ms_{n-2} + \ldots + ms_{n-N-1}}{N}$$

Figure 5:
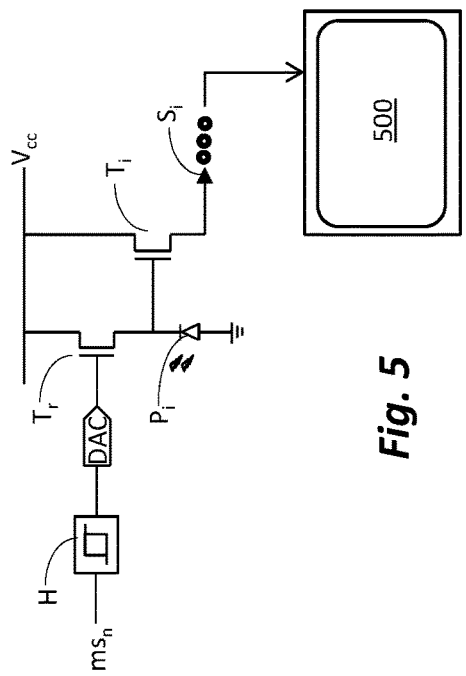
FIG. 5 illustrates a photosensor circuit according to one embodiment.

An embodiment of a circuit for implementing an improved reset process is illustrated in FIG. 5. The illustration of FIG. 5 depicts only one pixel, but the same circuit will be repeated for each pixel. The signal from all of the pixels is ultimately sent for display on a screen 500. The sensor pixel $P_i$ is coupled between ground level and the gate of the integration transistor, and the drain of the reset transistor $T_r$. The source of both transistors $T_r$ and $T_i$ is coupled to $V_{cc}$. As light hits the pixel, the output of the pixel $P_i$ opens the gate of the integration transistor $T_i$, such that an integration signal $S_i$ is output and can be integrated (not shown). When it is desired to reset the pixel, a voltage potential is applied to the gate of reset transistor $T_r$ from the DAC. However, it is discovered by the inventors that simply applying each calculated reset signal to the DAC leads to unwanted artificial effects in the image. Therefore, in the embodiment of FIG. 5, a hysteresis gate H is inserted upstream of the DAC. In one embodiment the hysteresis gate is implemented in software and functions as a threshold, such that if the ms signal is below a threshold, the signal is not supplied to the DAC, such that the pixel is not reset. As described above, the hysteresis can also be introduced by using a moving average for each reset value. Conversely, if implemented in hardware, the hysteresis gate can be implemented using an inductor. Also, rather than applying each calculated $ms_n$, and average of N calculated multislope levels can be averaged.

It should be understood that processes and techniques described herein are not inherently related to any particular apparatus and may be implemented by any suitable combination of components. Further, various types of general purpose devices may be used in accordance with the teachings described herein. The present invention has been described in relation to particular examples, which are intended in all respects to be illustrative rather than restrictive. Those skilled in the art will appreciate that many different combinations will be suitable for practicing the present invention.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

The invention claimed is:

1. A method for dynamically controlling integration of output signal of a photon sensor, comprising:
   initiating a frame wherein the output signal is continuously integrated for each pixel of the photon sensor for an integration period $t_f$;
   defining a first reset time $t_1$, shorter than the integration period $t_f$;
   setting a first reset threshold defining a value above which pixels will be reset;
   setting a first reset value defining a value to which pixels are reset;
   at the first reset time, resetting all pixels having a value higher than the first reset threshold to the first reset value;
   at the end of the integration period, determining an average pixel value, and according to the average pixel value determining whether to set a new value for at least one of the first reset threshold and the first reset value for a next frame.

2. The method of claim 1, wherein setting a new value for the first reset threshold comprises setting the first reset threshold to equal average pixel value at end of the frame.

3. The method of claim 1, wherein setting a new value for the first reset threshold comprises setting the first reset threshold to equal value of brightest pixel which was never reset at end of the frame.

4. The method of claim 1, wherein setting a new value for the first reset threshold comprises calculating an average pixel value ratio by dividing the average pixel value by total number of bins, subtracting the average pixel value ratio from one to obtained a mirrored average pixel value ratio, and multiplying the mirrored average pixel value ratio by the total number of bins.

5. The method of claim 1, wherein setting a new value for the first reset value comprises calculating a pixel value that lies on a straight line from value of darkest pixel to value of brightest pixel which was never reset, on a histogram of the frame.

6. The method of claim 1, wherein setting a new value for the first reset value comprises calculating a pixel value that is on an intersection of time $t_1$ and a straight line from value of darkest pixel to value of brightest pixel which was never reset, on a histogram of the frame.

7. The method of claim 1, further comprising setting a scaling factor and, when it is determined that at least one of the first reset threshold and the first reset value for a next frame should be changed, applying the scaling factor to at least one of the first reset threshold and the first reset value for a next frame.

8. The method of claim 1, further comprising: modifying the value of the first reset time $t_1$ when it is determined that at least one of the first reset threshold and the first reset value for a next frame should be changed.

9. The method of claim 1, further comprising applying a hysteresis when it is determined to change at least one of the first reset threshold and the first reset value for a next frame.

10. The method of claim 1, wherein applying hysteresis comprises applying a moving average.

11. The method of claim 1, further comprising:
   defining a second reset time $t_2$, shorter than the integration period $t_f$ but longer than the first reset time $t_1$;
   defining a second reset threshold;
   defining a second reset value;
   at the end of the integration period, determining whether to set a new value for at least one of the second reset threshold or second reset value for the next frame.

12. The method of claim 11, wherein setting a new value for the second reset threshold comprises setting the second reset threshold according to a secondary average pixel value, wherein the secondary average pixel value corresponds to an average pixel value calculated using only pixels with values greater than the first reset threshold.

13. The method of claim 11, wherein setting a new value for the second reset threshold comprises setting the second reset threshold to equal value of brightest pixel which was reset only once at end of the frame.

14. The method of claim 12, wherein setting a new value for the second reset threshold further comprises dividing the secondary average pixel value by total number of bins to obtain a secondary average pixel value ratio.

15. The method of claim 14, further comprising multiplying the secondary average pixel value ratio by total number of bins of value higher than the first reset threshold.

16. The method of claim 14, further comprising subtracting the secondary average pixel value ratio from 1 to obtained a mirrored ratio and multiplying the mirrored ratio by total number of bins of value higher than the first reset threshold.

17. The method of claim 16, further comprising adding an offset value equal to the value of the first reset threshold.

18. A method for dynamically controlling an optical sensor by recursively performing the steps comprising:
    initiating a frame and integrating an output signal of all pixels of the sensor for a time period $t_f$;
    prior to ending the frame, at a preset time $t_1$, resetting all pixels having intensity value greater than a reset threshold, $R_1$, to a reset value, $R'_1$, that is lower than $R_1$;
    when reaching time $t_f$ ending integration of the output signal of all pixels and calculating an average pixel value for the frame;
    calculating new value for at least one of $R_1$ and $R'_1$ based on the average pixel value.

19. The method of claim 18, wherein when the average pixel value corresponds to a bright image, calculating new value for at least one of $R_1$ and $R'_1$ comprises calculating a value lower than current value.

20. The method of claim 18, wherein when the average pixel value corresponds to a dark image, calculating new value for at least one of $R_1$ and $R'_1$ comprises calculating a value higher than current value.

21. The method of claim 18, wherein when the average pixel value corresponds to a bright image, the method further comprises the step of calculating lower value for time $t_1$.

22. The method of claim 18, wherein when the average pixel value corresponds to a dark image, the method further comprises the step of calculating higher value for time $t_1$.

23. The method of claim 18, further comprising the steps:
    at a second preset time $t_2$, occurring after time $t_1$ but before time $t_f$, resetting all pixels having intensity value greater than a second reset threshold, $R_2$, to a second reset value, $R'_2$, wherein $R_2$ is higher than $R_1$; and,
    after time $t_f$ calculating a new value for at least one of $R_2$ and $R'_2$ based on secondary average pixel value, wherein the secondary average pixel value is calculated using only pixels having value larger than $R_1$.

24. The method of claim 23, wherein:
calculating a new value for $R_1$ is performed using one of the following relationships:

$$R_1 = L\left(1 - \frac{1}{L}\frac{\text{sum of all pixel values}}{\text{total pixel count}}\right); \text{ or}$$

$$R_1 = L\left(1 - \frac{S1}{L}\frac{\text{sum of all pixel values}}{\text{total pixel count}}\right); \text{ or}$$

$$R_1 = L\left(\frac{1}{L}\frac{\text{sum of all pixel values}}{\text{total pixel count}}\right);$$

and wherein calculating a new value for $R_2$ is performed using one of the following relationship:

$$R_2 = (L - R_1)\left(1 - \frac{1}{L}\frac{\text{sum of all pixels with values} > R_1}{\text{total count of pixels with values} > R_1}\right) + R_1; \text{ or}$$

$$R_2 = (L - R_1)\left(1 - \frac{S2}{L}\frac{\text{sum of all pixels with values} > R_1}{\text{total count of pixels with values} > R_1}\right) + R_1; \text{ or}$$

$$R_2 = (L - R_1)\left(\frac{1}{L}\frac{\text{sum of all pixels with values} > R_1}{\text{total count of pixels with values} > R_1}\right) + R_1;$$

wherein L is the total number of bins for the sensor and S1 and S2 comprise scaling factors.

25. The method of claim 24, wherein:
calculating a new value for $R'_1$ is performed using the following relationships:

$$R'_1 = (R_1 - O_{mean}) * \frac{t_1}{t_f} + O_{mean};$$

and wherein calculating a new value for $R'_2$ is performed using the following relationship:

$$R'_2 = (R_2 - R'_1) * \frac{t_2 - t_1}{t_f - t_1} + R'_1;$$

wherein $O_{mean}$ is value of darkest pixel of the sensor.

26. The method of claim 18, further comprising averaging the new value with new values calculated for N previous frames to obtain averaged new value, and applying the averaged new value to a following frame.

* * * * *